United States Patent [19]

Lang

[11] 3,953,863
[45] Apr. 27, 1976

[54] METHOD AND APPARATUS FOR FOCUSING AN OBJECTIVE

[75] Inventor: Karl Lang, Atzbach, Germany

[73] Assignee: Ernst Leitz G.m.b.H.

[22] Filed: Nov. 27, 1973

[21] Appl. No.: 419,282

[30] Foreign Application Priority Data
Dec. 11, 1972  Germany............................ 2260474

[52] U.S. Cl................................... 354/25; 352/140
[51] Int. Cl.$^2$.......................................... G03B 3/10
[58] Field of Search ............. 354/25, 162, 163, 165, 354/166, 4; 352/140; 353/101; 356/122

[56] References Cited
UNITED STATES PATENTS

| | | | |
|---|---|---|---|
| 3,233,533 | 2/1966 | Sauer | 354/166 |
| 3,450,018 | 6/1969 | John, Jr. | 354/25 |
| 3,469,925 | 10/1969 | Urbach et al. | 353/101 X |
| 3,504,610 | 4/1970 | Dönitz | 354/25 |
| 3,511,156 | 5/1970 | Larks | 354/25 |
| 3,516,742 | 6/1970 | Dönitz | 356/122 X |
| 3,596,101 | 7/1971 | Soneya | 352/140 X |
| 3,622,797 | 11/1971 | Bragg | 353/101 X |
| 3,631,785 | 1/1972 | Perlmann et al. | 354/25 |
| 3,639,048 | 2/1972 | Heaney | 353/101 |
| 3,682,071 | 8/1972 | Hosoe | 354/25 |
| 3,781,110 | 12/1973 | Leitz et al. | 354/163 X |

OTHER PUBLICATIONS
IBM Disclosure Bulletin, Vol. 15, No. 2, July 1972.

*Primary Examiner*—L. T. Hix
*Assistant Examiner*—E. M. O'Connor
*Attorney, Agent, or Firm*—Gilbert L. Wells

[57] ABSTRACT

In a method for focusing a reproducing objective, such as may be used for measuring distances, wherein multiplication of the image of the entrance pupil is achieved by image-splitting optical elements mounted in the plane of the object image, the improvement comprising:

projecting the light fluxes from different parts of the pupil image plane on separate sets or groups of photoelectric receivers, deriving a signal from the comparison of the output signals from these receiver groups and using this signal as a criterion for focusing as a function of magnitude and sign. Apparatus for performing the method includes a grid of prisms or pyramids, and a beam splitter for directing light through two separate photoelectric receiver masks.

6 Claims, 7 Drawing Figures

METHOD AND APPARATUS FOR FOCUSING AN OBJECTIVE

CROSS REFERENCE TO A RELATED APPLICATION

Applicant claims priority under 35 U.S.C. 119 for application Ser. No. P 22 60 474.6, filed Dec. 11, 1972 in the Patent Office of the Federal Republic of Germany.

BACKGROUND OF THE INVENTION

The invention relates to a method for focusing a reproducing objective, for instance for distance measurements, wherein multiplication of the image of the entrance pupil or iris is achieved by means of image splitting optical elements located in the plane of the object image.

The state of the art of follow up systems for focusing the slide in a slide projector may be ascertained by reference to U.S. Pat. Nos. 3,399,595 and 3,517,992, and the follow up systems are useful in focusing the objective of the present invention. The disclosures of these patents are incorporated herein.

With regard to photographic cameras, it is known to mount pyramidal grids or rasters on the pane of the viewer for the purpose of focusing the objective or for visual assessment of the same. For each direction of surface inclination of the trilateral or quadrilateral pyramid, there will be a laterally shifted reproduction of the objective pupil, provided a lens reproducing the object pupil is mounted in the vicinity of the grid plane. The observing (ocular) puil covers part of the domain of the overlapping pupil images. However, since the ocular pupil is of a different relative position in each of the pupil images, many object images shifted by parallax and corresponding in number to that of the pupil images will occur when the focusing plane is moved out of the screen plane. Errors in camera objective setting therefore are noted by the fuzzy, fringy nature of the transitions in image contrasts.

Under such conditions, it becomes difficult to subjectively assess focus, especially if there is great depth of field of the reproduction through the camera objective.

SUMMARY OF THE INVENTION

The object of the present invention therefore is to create a method for focusing a reproducing objective such as is used in photographic cameras and the like, wherein there will not be the above-described difficulty relating to known visual-subjective methods, which will not require accurate objective setting at the edges of the images, and which will allow the use of automatic objective setting devices.

The object of the present invention is achieved by applying light fluxes from different parts of the pupil plane to separate photoelectric receiver groups and deriving a signal from the latter to serve as a criterion for focus as a function of magnitude and sign.

Advantageous systems for implementing the method of the present invention are also disclosed herein.

The special advantage of the novel method of the present invention consists in its many faceted applicability. If electronic automatic control is dispensed with, the novel devices of the invention may also be used as an improved, visual, static display. The setting criterion in this instance is the equality in brightness of two test fields.

BRIEF DESCRIPTION OF THE DRAWINGS

The new method and the corresponding devices and systems are best described by reference to the appended drawings, wherein.

DESCRIPTION OF THE PREFERRED EMBODIMENTS

Figure 1:
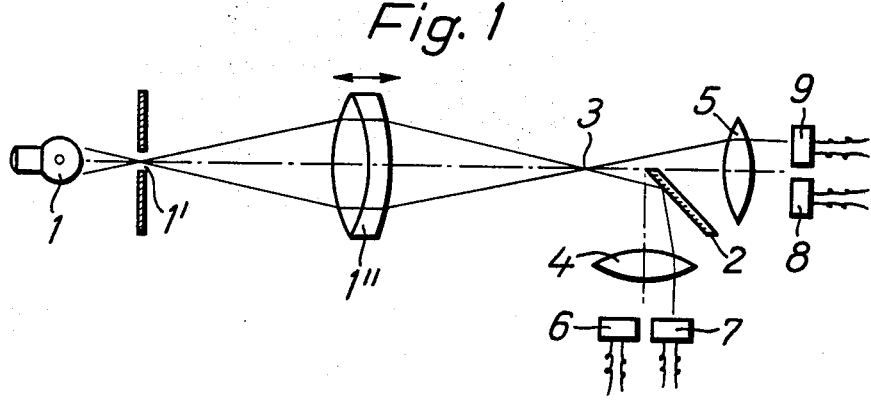
FIG. 1 shows schematically an embodiment of the elements of the present invention for focusing an objective.

As shown in FIG. 1, a light source 1 illuminates a narrow light slit 1' normal to the plane of the drawing. Light slit 1' is reproduced in the region of a dividing mirror 2 by means of an objective 1'', for instance at location 3. The parts of the split beam are applied by means of condensing lenses (4, 5) mounted downstream dividing mirror 2 to two photoelectric receiver sets 6, 7 and 8,9. Shifting objective 1'' along the optical axis allows the displacement of the image location 3 of slit 1' in front of and behind dividing mirror 2.

If location 3, as shown, lies in front of dividing mirror 2, then receivers 7 and 9 will be illuminated, while receivers 6 and 8 will not be. When the image location 3 is moved beyond mirror 2, illumination passes to the photoelectric receivers 6 and 8. The change in signal at the outputs of the receiver sets 6, 7 and 8, 9 occurring when the location of focusing is passing the front edge of mirror 2 therefore is a criterion for the focusing of the slit image.

Figure 2:
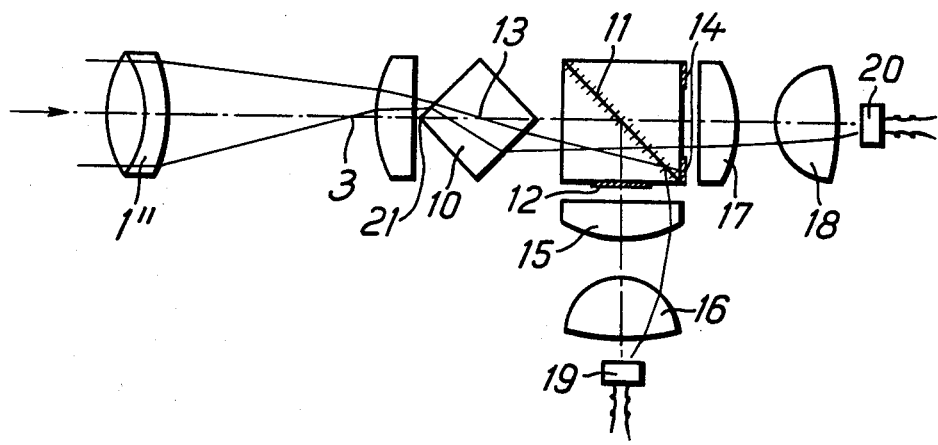
FIG. 2 shows schematically another embodiment of the elements of the present invention for focusing an objective.

Such a change in signal will also be obtained from the arrangement of FIG. 2. A luminous object, not shown, is to be focused by means of objective 1'' which is followed by a prism 10 having its front edge 21 as well as its rear edge aligned to the optical axis of said objective. A beam splitting prism 11 is located behind prism 10, the exit surfaces of prism 11 being provided with two complementary stops 12, 14 for blocking light fluxes passing the device close to the axis and away from the axis respectively. The rays leaving beam splitter 11 and passing through lenses 15, 16 and 17, 18 are collected respectively at photoelectric receivers 19 and 20.

The method of operation of the arrangement described so far is as follows:

If the object is focused in front of edge 21 of prism 10, for instance at location 3, the refracting power of prism 10 is concentrating the image of the entrance pupil reproduced by objective 1'' close to the optical axis. Therefore, only receiver 20 will be illuminated as light fluxes emitted from said image and deflected by the splitting surface of beam splitting prism 11 will be blocked by stop 12, while light fluxes penetrating beam splitter 11 will pass stop 14.

Yet if the object is focused behind edge 21, for instance at location 13, the image of the entrance pupil is formed away from the optical axis as a result of the refracting power of prism 10, thus causing the illumination of receiver 19 only as light fluxes deflected by beam splitter 11 will pass stop 12 but will be blocked by stop 14 after penetrating prism 11. Therefore, the image position with respect to the edge 21 of prism 10 is shown by the ratio of the photoelectric receiver outputs. Exact focus signified by coincidence of edge 21 and the focus of objective 1″ is represented by equality of signals.

Figure 3:
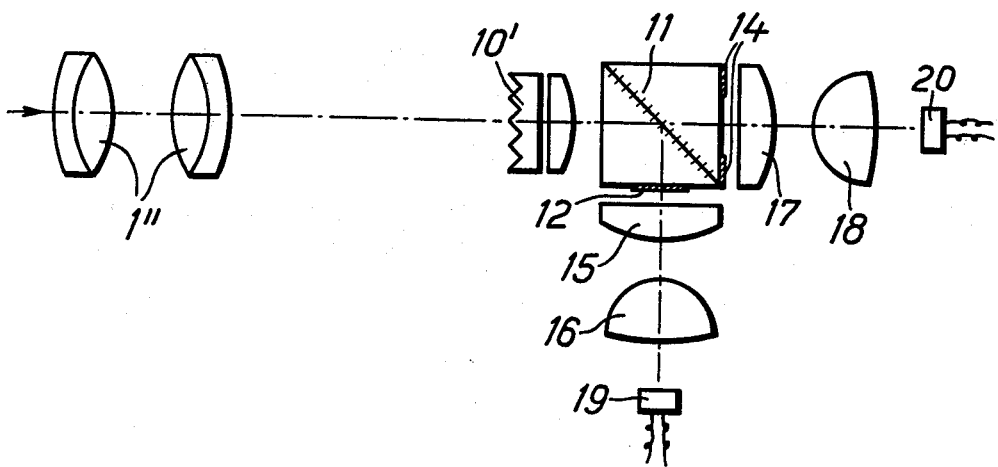
FIG. 3 shows schematically still another embodiment of the elements of the present invention for focusing an objective using a beam splitter.

As regards the arrangement of FIG. 3, prism 10 of FIG. 2 is replaced by a grid of prisms 10′. The remaining components are denoted by the same reference numerals and operate as in FIG. 2. The grid of prisms 10′ may also be replaced by a grid of pyramids of known kind. Stops 12, 14 must be adapted to the grid geometry.

Figure 4:
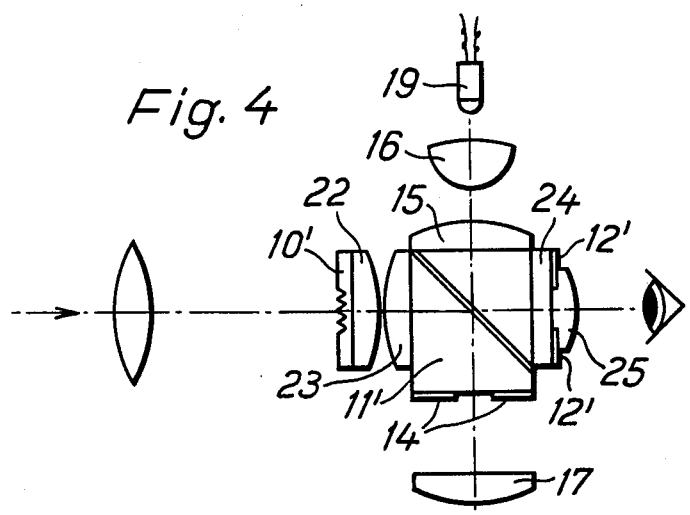
FIG. 4 shows schematically yet another embodiment of the elements of the present invention for focusing an objective having an arrangement for the visual observation of a pupil sector near the axis.

The arrangement of FIG. 4 differs from that of FIG. 3 in being provided with a polarizing beam splitter 11′. The object, not shown, is reproduced in the region of the grid plate 10′. Collecting optical elements project the light passing through the grid plate to the polarizing splitter 11′. Stop 12′, corresponding to stop 12 of FIG. 3, in this instance is made reflecting and separated from splitter 11′ by means of a quarter-wave plate 24, so that the reflected light rays far from the axis are projected on the photoelectric receiver 19 by means of lenses 15, 16. Ocular 25 is located behind stop 12′, allowing visual observation of the rays being transmitted. Components 14, 17, 18, 20 are analogous to those of FIG. 3.

Figure 5:
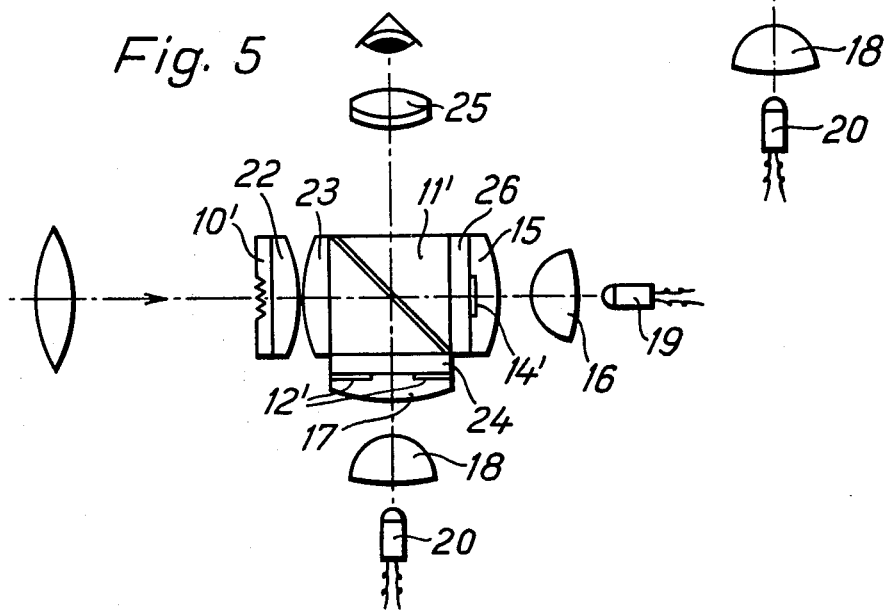
FIG. 5 shows schematically an embodiment of the elements of the present invention having reflecting pupil stops, a polarizing beam splitter and two quarter-wave plates.

In the arrangement of FIG. 5, both stops 12′ and 14′ are reflecting and separated from the polarizing splitter 11′ by quarter-wave plates 24, 26 so that the light rays away from the axis reflected at stop 12′ and the paraxial rays reflected at stop 14′ reach via the ocular 25 an observer's eye. The ray portions passing the stops 12′, 14′ reach the photoelectric receivers 19, 20 as in FIG. 3.

Figure 6:
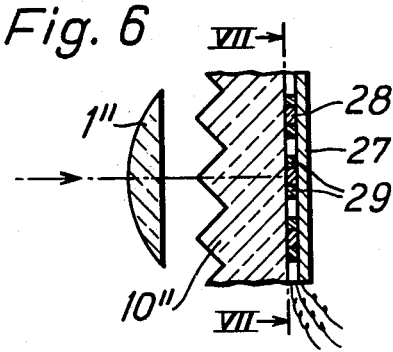
FIG. 6 is a side view of a prism useful in the present invention having a photoelectric differential receiver.
Figure 7:
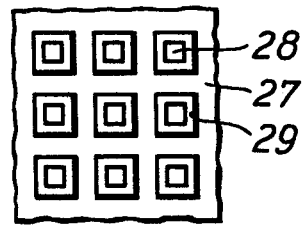
FIG. 7 is a detailed showing of the differential receiver of FIG. 6 along the line VII—VII.

In the variation of the invention shown in FIG. 6, splitting of the light beams onto different photoelectric receivers is achieved by designing these receivers proper as a photoelectric differential receiver group 27, as shown in detail in FIG. 7. This group is mounted in the rear of the grid of pyramids 10″ at a spacing corresponding to the deviation angle of this pyramid grid 10″ and to the aperture of objective 1″. The receiver group 27 is so designed that its subdivision corresponds to that of grid 10″ and that the limited field of one set of receivers 28 is located behind each peak of a grid element, while the adjacent receiver elements are combined into a group or set of receivers 29 for the rays more removed from the peaks. Equality of signal at the receiver outputs here to is the criterion for focusing the object image on the grid plate 10″.

The arrangement shown in FIGS. 6 and 7 is particuarly well suited for photographic cameras.

Following focusing adjustment, the distance between object and adjustment component may be read off, for instance from a suitable scale on the objective setting.

I claim:

1. A method for focusing an objective of an object projecting light fluxes consisting of said objective having an entrance pupil receiving said light fluxes and reproducing the image of said entrance pupil at an image plane, splitting optical elements mounted in the range of said image plane for achieving multiplication of said image of said entrance pupil, selecting from said light fluxes predetermined ones passing through different parts of said entrance pupil, applying said fluxes to first and second photoelectric receiver means for generating output signals corresponding to said light fluxes passing through said different pupil parts, comparing said signals of said receiver means, deriving a signal from said comparison, and using said signal for focusing said objective according to magnitude and sign of said signal.

2. The method of claim 1, further consisting of separating said image plane into two planes of spatially different location by means of a beam splitter (11), said different planes corresponding to said photoelectric receiver means.

3. A system comprising an objective with an optical axis and an entrance pupil, said objective being adjustable for focusing an object image in a plane along said optical axis, ray splitting optical elements mounted in said image plane selecting light fluxes from different parts of said entrance pupil, first and second photoelectric receiver means receiving said light fluxes from said different part of said entrance pupil and generating output signals depending on the amount of light received, means for comparing said output signals and generating a comparison signal and means responsive to said comparison signal for focusing said objective according to magnitude and sign of said comparison signal.

4. The system of claim 3, further comprising a beam splitter (11) located along said optical axis producing together with a field lens and said ray splitting optical elements on respectively each exit surface of the splitter, two spatially separate double images of said entrance pupil in spatially separate planes corresponding to said first and second photoelectric receiver means, said two spatially separate double images having first and second separate axes, first and second stops 12, 14 located along said first and second separate axes at said double images, said stops being matched to the geometrical form of said image splitting elements and having apertures corresponding respectively to the paraxial part of said entrance pupil and to the complementary part of said entrance pupil, and one objective and one condensing lens each located along said first and second separate double image axes for collimating the light fluxes passing said apertures onto said receiver means.

5. The system of claim 3, wherein said ray splitting optical elements comprise a grid of pyramids (10″) mounted in said plane of the image of the object.

6. The system of claim 3, wherein said ray splitting optical elements comprise a grid of prisms (10′) mounted in said plane of the image of the object.

* * * * *